(12) United States Patent
Tian et al.

(10) Patent No.: US 10,897,484 B2
(45) Date of Patent: Jan. 19, 2021

(54) RFC-DIRECTED DIFFERENTIAL TESTING METHOD OF CERTIFICATE VALIDATION IN SSL/TLS IMPLEMENTATIONS

(71) Applicant: Xidian University, Xi'an (CN)

(72) Inventors: Cong Tian, Xi'an (CN); Chu Chen, Xi'an (CN); Zhenhua Duan, Xi'an (CN)

(73) Assignee: XIDIAN UNIVERSITY, Xi'an (CN)

(*) Notice: Subject to any disclaimer, the term of this patent is extended or adjusted under 35 U.S.C. 154(b) by 347 days.

(21) Appl. No.: 15/990,842

(22) Filed: May 29, 2018

(65) Prior Publication Data

US 2019/0306193 A1    Oct. 3, 2019

(30) Foreign Application Priority Data

Mar. 31, 2018 (CN) .......................... 2018 1 0278731

(51) Int. Cl.
  *H04L 29/06* (2006.01)
  *H04L 9/32* (2006.01)
  *G06F 21/33* (2013.01)

(52) U.S. Cl.
  CPC .......... *H04L 63/166* (2013.01); *H04L 9/3268* (2013.01); *H04L 63/0823* (2013.01); *G06F 21/33* (2013.01)

(58) Field of Classification Search
  CPC . H04L 63/166; H04L 9/3268; H04L 63/0823; G06F 21/33
  USPC ......................................................... 713/156
  See application file for complete search history.

(56) References Cited

U.S. PATENT DOCUMENTS

| 8,793,487 B2* | 7/2014 | Epstein | .................. | H04L 9/006 |
|  |  |  |  | 713/157 |
| 10,454,689 B1* | 10/2019 | Sharifi Mehr | ............ | H04L 9/14 |
| 2005/0097332 A1* | 5/2005 | Imai | .................... | H04L 63/0823 |
|  |  |  |  | 713/176 |

(Continued)

OTHER PUBLICATIONS

Using Frankencert for Automated Adversarial Testing of Certificate Validation in SSL/TLS Implementations Chad Brubaker, Suman Jana, Biashakhi Ray, Sarfraz Khurshid Vitaly Shamtikaov IEEE Symposium on Security and Privacy, Google, The University of Texas at Austin, University of California, Davis (Year: 2014).*

(Continued)

*Primary Examiner* — Noura Zoubair
*Assistant Examiner* — Mohammad S Shams
(74) *Attorney, Agent, or Firm* — Bayramoglu Law Offices LLC

(57) ABSTRACT

The present invention relates to the technical field of computer software analysis and discloses an RFC-directed differential testing method of certificate validations in a SSL/TLS implementations which includes: extracting rules from RFC and updating the rules, classifying the rules, further classifying consumer rules and shared rules into breakable rules and unbreakable rules, expressing the rules as variables, and generating a symbolic program; generating low-level test cases by applying the dynamic symbolic execution technique to the symbolic program; assembling high-level test cases i.e. digital certificates according to the low-level test cases; and employing the assembled digital certificates to the differential testing of the certificate validation in SSL/TLS implementations.

8 Claims, 3 Drawing Sheets

(56) References Cited

U.S. PATENT DOCUMENTS

| | | | |
|---|---|---|---|
| 2010/0023534 A1* | 1/2010 | Liu | G01R 31/3177 707/E17.044 |
| 2015/0089232 A1* | 3/2015 | Belton | H04L 63/0823 713/175 |
| 2015/0254451 A1* | 9/2015 | Doane | G06Q 30/0601 726/1 |
| 2016/0173287 A1* | 6/2016 | Bowen | H04L 9/321 713/156 |
| 2017/0147482 A1* | 5/2017 | Li | G06F 11/3608 |
| 2017/0195122 A1* | 7/2017 | Obaidi | H04L 9/321 |

OTHER PUBLICATIONS

SymCerts: Practical Symbolic Execution for Exposing Noncompliance in X.509 Certificate Validation Implementations Sze Yui Chau, Omar Chowdhury, Endadul Hoque, Huangyi Ge, Aniket Kate, Cristina Nita-Rotaru, Ninghui Li The university of Iowa, Iowa City, Iowa, USA (Year: 2017).*

Cryptographic strength of ssl/tls server: Current and recent practices Homin K. Lee, Tal Malkin, Eric Nahum IMC '07: Proceedings of the 7th ACM SIGCOMM conference on Internet measurement. Oct. 2007, pp. 83-92. (Year: 2007).*

Guided differential testing of certificate validation in SS/TLS implementations Yuting Chen, Zhendong Su Proceddings of the 2015 10th Joint Meeting on Foundations of Software Engineering. Aug. 2015, pp. 793-804 (Year: 2015).*

* cited by examiner

RFC-DIRECTED DIFFERENTIAL TESTING METHOD OF CERTIFICATE VALIDATION IN SSL/TLS IMPLEMENTATIONS

CROSS REFERENCE TO RELATED APPLICATIONS

This application is based upon and claims priority to Chinese Patent Application No. CN201810278731.0, filed on Mar. 31, 2018, the entire contents of which are incorporated herein by reference.

TECHNICAL FIELD

The invention relates to the technical field of computer software analysis, particularly to an RFC-directed differential testing method of a certificate validation in SSL/TLS implementations.

BACKGROUND

Currently, the traditional technologies commonly used in the industry are as follows. With the rapid development of computer network technology, the Internet is increasingly linked with people's work, life, and learning, and the importance of Internet security is becoming increasingly prominent. To enhance security, the Hypertext Transfer Protocol (HTTP) of the Internet is upgraded to Hypertext Transfer Protocol Secure (HTTPS). Compared with HTTP, HTTPS uses Secure Sockets Layer (SSL)/Transport Layer Security (TLS) to ensure the security of Internet communications. SSL/TLS authenticates a server or client by validating its digital certificate in the handshake phase. As for the authentication of a server, the server sends its digital certificate to a client, and the client validates the received digital certificate to determine whether the server is the genuine communication server. The authentication of a client can be conducted similarly. Only if a server or client is authenticated, can subsequent key formation and encrypted communication continue. It is of great importance whether the authentication can be performed correctly. The subsequent communication may be dangerous if the authentication falsely accepts an invalid certificate provided by a malicious server/client. Likewise, a reasonable requirement for the communication may be denied if the authentication falsely rejects a valid certificate which is owned by a benign server/client. Therefore, it is critical to implement a digital certificate validation correctly. An effective testing of the certificate validation in SSL/TLS implementations is necessary to ensure its correctness. For the methodology named Frankencert in the prior art, the digital certificates are mutated beforehand then used for the differential testing of the certificate validation in SSL/TLS implementations. The Frankencert methodology generates 8,127,600 new certificates by combining components of 243,246 digital certificates selected from the Internet. Their testing of 15 different SSL/TLS implementations yields 208 discrepancies. These discrepancies are further reduced to 9 different discrepancies. To improve the efficiency of the differential testing, a mutation approach named Mucert which is guided by code coverage and adopts the Markov Chain Monte Carlo (MCMC) sampling method is used. Mucert employs 37 mutators to mutate 1005 digital certificates. With the mutated digital certificates, 27 distinct discrepancies are found in the differential testing of 9 SSL/TLS implementations. Although differential testing has been successfully applied to the certificate validation of SSL/TLS implementations by the Frankencert and Mucert methods, there are still some problems with the methods. First, a discrepancy found in the differential testing shows neither why it occurs, nor which SSL/TLS implementations go wrong. Second, some of the mutated certificates used in differential testing cannot be opened by the utilities available, so it is difficult to analyze their structures or contents. Third, it is an open question whether differential testing of certificate validation in SSL/TLS implementations is always valid. Therefore, it is necessary to propose a more efficient testing method that can solve these problems.

In conclusion, the problems in the prior art are as follows.

(1) A discrepancy found in the differential testing shows neither why it occurs, nor which SSL/TLS implementations go wrong.

The digital certificate used in the differential testing is obtained by mutation, and if the mutated digital certificate causes a discrepancy, the reason why the discrepancy occurs cannot be directly explained. Irrespective of test engineers or SSL/TLS development engineers, the reason why the discrepancy occurs may only be explained after the structure and content of the mutated digital certificate are fully analyzed to determine which SSL/TLS implementations contain errors. If the analysis is done manually, then the analyst who is examining the data must be familiar with the structure and constraints of the digital certificates along with the analysis of the structure and content of the mutated digital certificates. Errors may occur easily in the analysis. However, if the analysis is completed by running the programs, the errors in the manual analysis may be reduced. However, to date, no such validation model has been achieved, therefore this type of analysis program addressing the mutated digital certificates should be constructed from the very beginning.

(2) Some of the mutated certificates used in differential testing cannot be opened by the utilities available, so it is difficult to analyze their structures or contents.

To analyze the structure and content of these mutated certificates, one method is to reconstruct the utilities available, and the other method is to construct new utilities. To reconstruct the utilities available, one needs to be familiar with its functions and code, and the rest of its functions cannot be affected. To construct a new utility, new functions should be designed and related code should be written.

The analysis, encryption, decryption, and signature algorithms of digital certificate structures are involved without regard to the reconstruction of utilities available and the construction of new utilities. This presents a great difficulty. However, if neither the utilities available are reconstructed nor new utilities are constructed, then there isn't a tool which can be used to analyze these digital certificates.

(3) Discrepancies found in differential testing are not always valid.

Since the digital certificates used in the differential testing are obtained from the mutation, it cannot be guaranteed that the reason for the discrepancy after the mutation is the violation of the rules with which the digital certificate must comply. For rules with a certain flexibility, different SSL/TLS implementations may have discrepancies, and this kind of discrepancy is invalid. Invalid discrepancies cannot be directly discriminated by traditional methods, and the analysis of invalid discrepancies is time-consuming and inefficient.

The difficulty and significance of solving the above-mentioned technical problems are as follows.

It would be difficult to address the above-mentioned technical problems by modifying the methods available. On one hand, if manual work is involved in the methods available, it is inefficient and prone to error. On the other hand, if an automated program is involved in the methods available, one should be familiar with the functions and code of systems available or design and realize a new system. Moreover, it is difficult to design and realize a new system due to the complicated nature of the encryption, decryption, and signature algorithms.

If the above-mentioned problems are to be addressed by inventing a new method, manual analysis or digital analysis construction may be avoided by automatically explaining the reason why discrepancies occur, and which SSL/TLS implementations have bugs, thereby assisting the developer of SSL/TLS to effectively discriminate and fix the bugs in SSL/TLS implementations. By assembling effective digital certificates, a test case may be loaded and analyzed by the utilities available, so that the cost of reconstruction or constructing a new analyzing utility can be avoided. By automatically discriminating the invalid discrepancies, the related works such as analysis etc. are avoided, so the work efficiency is improved.

SUMMARY

In view of the problems in the prior art, the present invention provides an RFC-directed differential testing method of a certificate validation in SSL/TLS implementations.

The present invention is implemented as follows: An RFC-directed differential test method of the certificate validation in SSL/TLS implementations includes extracting and updating rules from RFC; classifying the rules wherein consumer rules and shared rules are classified into two categories including breakable rules and unbreakable rules; expressing the rules as variables and generating a symbolic program; generating low-level test cases by applying the dynamic symbolic execution technique to the symbolic program; assembling high-level test cases i.e. digital certificates according to the low-level test cases; and employing assembled digital certificates to the differential testing of a certificate validation in SSL/TLS implementations.

Furthermore, the RFC-directed differential testing method of the certificate validation in SSL/TLS implementations includes:

Step 1: extracting the rules of the digital certificate from RFCs 5280 and 6818 according to the keyword set specified by RFC 2119 and updating the rules of RFC 5280 according to RFC 6818;

Step 2: classifying the updated rules into three categories i.e. producer rules, consumer rules, and shared rules, and further classifying the consumer rules and shared rules into breakable rules and unbreakable rules, then expressing the rules as variables and generating a symbolic program;

Step 3: generating low-level test cases by applying the dynamic symbolic execution technique to the symbolic program and assembling high-level test cases i.e. digital certificates according to the low-level test cases;

Step 4: employing assembled digital certificates to a differential testing of a certificate validation in SSL/TLS implementations and calculating a discrepancy number, a distinct discrepancy number, a bug number, and an RFC conformance ratio in the test results based on information of the digital certificate.

Step 1 specifically includes:

(1) extracting the rules of digital certificate from RFCs 5280 and 6818 according to the keyword set required to be obeyed in writing RFC specified in RFC 2119; wherein page breaks, headers, footers, and redundant blank lines in the text of RCF 5280 or RFC 6818 i.e. rfc5280.txt or rfc6818.txt are deleted and the text after deletion is recorded as R; R is split into sections according to Level 1 titles; for each of the sections from Section 4 to 8 in RFC 5280 and Section 2 to 8 in RFC 6818, first, the rule set variable ruleSet is set as null set and the rule number ruleNum is set as 0, then English sentences in the content between arbitrary j-level title ($1 \leq j \leq 5$) of RFC 5280, j-level title ($1 \leq j \leq 2$) of RFC 6818 and the next title thereof are extracted according to ".\n" and ".", while the structure represented by Abstract Syntax Notation One (ASN.1) is extracted according to "::=", "::={\ln . . . }\ln" and "::={\ln . . . }\ln'", where "::=", "::={\ln . . . }\ln" and "::={\ln . . . }\ln'" respectively represent no left and right braces, having left and right braces which are in the same row, and having left and right braces which are not in the same row in the ASN.1 structure definition;

whether the keywords specified in RFC 2119 are contained is determined for each English sentence and each ASN.1 structure. If the keywords are contained, the sentence or structure is a rule which is recorded as s, meanwhile, ruleNum is added by 1, ruleNum, the j-level title and the rule s constitute a triple s'=(ruleNum,Title j, s); the s' is added in ruleSet; and ruleSet is saved as a text file in the end;

(2) updating the rules of RFC 5280 according to RFC 6818; wherein the rules in a respective section are respectively added to an obsolete rule set obRuleSet and an updated rule set upRuleSet according to a characteristic of RFC 6818 in which the marks " . . . says:", " . . . replaced with:" and "add(ed) . . . " indicate obsolete, updated, and additional paragraphs, respectively; then, word sets wordSet$_r$ that constitute each rule r is calculated, and a word set difference of any two rules $r_1$ and $r_2$ is calculated i.e. Matrix[$r_1$,$r_2$]=|wordSet$_{r_1}$−wordSet$_{r_2}$|; finally, each rule o in obRuleSet is calculated as follows: finding out the u that makes Matrix[o,u] have the smallest value by calculation from all of the u in upRuleSet, and the u obtained is assigned to the updated rule recorded as Update$_o$ of rule o, Update$_o$=arg min$_u$(Matrix[o,u]), if such Matrix[o,u] does not exist, it indicates that the rule o is discarded i.e. Update$_o$=discarded, if Matrix[o,u]=Matrix[u,o]=0, it indicates that the rule o is not changed i.e. Update$_o$=unchanged, otherwise, the rule u is used to update rule o i.e. Update$_o$=u, and the rule o of RFC 5280 is updated by Update$_o$.

Step 2 specifically includes:

(1) Classifying the updated rules into three categories: producer rules, consumer rules, and shared rules; wherein, the producer rule set producerRuleSet, consumer rule set consumerRuleSet, and shared rule set sharedRuleSet are set as null sets, respectively; for each rule r in the updated rule set updatedRuleSet of RFC 5280 and any pattern m in a pattern set of the producer rules, if r matches with m, then r is added to producerRuleSet; for any pattern m' in a pattern set of consumer rules, if r matches with m', then r is added to consumerRuleSet;

the shared rule set is an intersection set of the producer rule set and the consumer rule i.e. sharedRuleSet= producerRuleSet∩consumerRuleSet; the shared rule set is removed from the producer rule set and the consumer rule set producerRuleSet−=sharedRuleSet and consumerRuleSet−=sharedRuleSet; the rules excluding the producer rules and consumer rules i.e. updatedRuleSet−=producerRuleSet−consumerRuleSet are finally collected as shared rules;

(2) the consumer rules and shared rules are further classified into breakable rules and unbreakable rules;

wherein a breakable rule set breakableRuleSet, an unbreakable rule set unbreakableRuleSet, and a pattern set of the unbreakable rules patternSet are set as null sets, respectively;

for any keyword m in the keyword set specified in RFC 2119 and any unbreakable rule pattern u, m+" "+u is added to patternSet;

for any rule r in a consumer rule and shared rule set csrSet and any pattern p in patternSet, if r matches with p, then r is added to unbreakableRuleSet; and the unbreakable rule set is calculated according to breakableRuleSet=csrSet−unbreakableRuleSet;

(3) expressing breakable rules and unbreakable rules as variables;

wherein, a response set responseSet, another reserved word set otherSet, and a rule variable set varSet are set as null sets; the keywords specified in RFC 2119 are added to a keyword set modalKeywordSet, words representing sentence structures are added to a sentence structure pattern set sentencePatterns, the words representing logical relationships are added to a logic pattern set logicPatterns, the words representing responses are added to a response pattern set responsePatterns, digital patterns are added to another reserved word pattern set otherPatterns, and the names and variations of digital certificate components are added to a component name set componentSet.

for any keyword m in modalKeywordSet and any response pattern rp in responsePatterns, the words after m+" "+rp in each unbreakable rule and breakable rule r are added to responseSet; the words in r that matches with any pattern p in otherPatterns are added to otherSet;

a reserved word set reservedSet is the union set of modalKeywordSet, sentencePatterns, logicPatterns, componentSet, responseSet, and otherSet;

for each unbreakable rule and breakable rule r, the words in r that do not belong to reservedSet are deleted to obtain r';

for any r', if r' is expressed by natural language, then all conditions expressed by the rule are obtained according to its syntax structure; for each condition, first condition="$c_1$, $v_1, \ldots, c_i, v_i$" is obtained, wherein $c_1, \ldots, c_i$ are names of the components involved in this condition, $v_1, \ldots, v_i$ are values of the corresponding components, $i \in \mathbb{N}$; if r' is an unbreakable rule, and if there is a response part, then the response response="consumer, actions" is obtained; condition[+":"+response] is added to varSet, wherein square brackets represent that when there is a response, it is indicated by condition+":"+response, otherwise it is indicated by condition; if r' is the breakable rule, and if there is a result part, then the result result="$c_1, v_1, \ldots, c_j, v_j$" is obtained; condition[+":"+result] is added to varSet, wherein the square brackets represent that when there is a result, it is indicated by condition+":"+result, otherwise it is indicated by condition;

for any r', if r' is expressed by ASN.1, and if there is an embedded constraint t for each optional component c, then a constraint of c is $constraint_c=\{$"c,absent", t$\}$; if there is no embedded constraint, then $constraint_c=\{$"c,absent", "c,present"$\}$; for each non-optional component c', its constraint is $constraint_{c'}=\{$"c,validValue"$\}$; the constraints of r' are combined and added to varSet;

for each constraint in varSet, commas and colons ("," and ":") are replaced by single underscore and double underscores ("_" and "__") respectively;

(4) forming a symbolic program in DSE technology by using the rule variables; wherein "# include <stdio.h>", "# include <klee/klee.h>" and "int main ( ){" are produced;

variable declarations are produced for rule variables;

the rule variables corresponding to the unbreakable rules and breakable rules are symbolized, respectively;

"if (v>0) printf ("v>0") else" is produced for the rule variable v corresponding to the unbreakable rule;

"if (v'<0) printf ("v'<0") else" is produced for the rule variable v' corresponding to the breakable rule;

the redundant "else" is deleted and "}" is added; and a file C is saved.

Step 3 specifically includes:

(1) processing the symbolic program by using DSE technology;

(2) saving the low-level test cases produced by the DSE as a text file by a redirection technology;

(3) reserving rule variables with non-zero value and replacing 2147483647 and −2147483648 with 1 and −1 respectively for each text file and deleting empty text files;

(4) setting valid values for basic components of the digital certificate;

(5) setting valid values for the components of basicConstraints and keyUsage if a certificate of a certification authority is being assembled;

(6) setting a value of a component in a condition part of the low-level test case according to a corresponding value requirement of the condition part;

(7) leaving the response part of the low-level test case for observation without any processing and setting a value required in violating the result part for the components in the result part of the low-level test case;

(8) signing tbsCertificate a signature by using a signature algorithm of signature in tbsCertificate if signatureAlgorithm has not been set yet;

(9) encoding the certificate and saving it as a digital certificate file.

Further, step 4 specifically includes:

(1) employing the assembled digital certificate in the differential testing of certificate validation in SSL/TLS implementation;

(2) calculating the discrepancy number, the distinct discrepancy number, the bug number, and the RFC conformance ratio in the test result by using the information formed during an assembly of the digital certificate;

wherein, specific RFC rules that are obeyed or violated by the digital certificate are figured out during the assembly of the digital certificate, so an (m+3)-dimension vector $\overrightarrow{RFCcert}=\langle SN, RFCreason, RFCresult, ResultI_1, \ldots, ResultI_m\rangle$ may be formed;

where, SN is a serial number of the digital certificate; RFCreason records the RFC rules that are obeyed or violated by the digital certificate; RFCresult represents whether the digital certificate should be accepted or rejected according to the RFC rules; $ResultI_i$ ($1 \leq i \leq m$) represents whether the digital certificate should be accepted or rejected by the $i^{th}$ SSL/TLS implementation being tested; the discrepancy number, the distinct discrepancy number, and the bug number in the test result may be calculated based on the information:

1) for any digital certificate, if there are tested SSL/TLS implementations $I_i$ and $I_j$ which make $ResultI_i \neq ResultI_j$, then a discrepancy is found in the test result;

2) for all the digital certificates that generate discrepancies, if the vector $\langle ResultI_1, \ldots, ResultI_m\rangle_x$ of a digital certificate x is different from the vector $\langle ResultI_1, \ldots, ResultI_m \rangle_y$ of any other digital certificate y, then a distinct discrepancy is found in the test result;

3) if RFCresult shows that the acceptance or rejection of the digital certificate are all in accordance with the RFC rules, then the discrepancy is invalid;

4) if $ResultI_i$ ($1 \le i \le m$) dose not match with RFCresult, then a bug in SSL/TLS implementation is found, and RFCreason provides a reason for an occurrence of the bug;

the RFC conformance ratio (CR) of the $i^{th}$ SSL/TLS implementation is calculated by the following formula;

$$CR(i) = \frac{|RFCresult \text{ matches } ResultI_i|}{|certs|} \times 100\%$$

where, |RFCresult matches $ResultI_i$| is the number of result complying with the RFC in the test result, |certs| is the number of the vector $\overrightarrow{RFCcert}$ in the testing.

Another objective of the present invention is to provide a computer software analysis system applying the RFC-directed differential testing method of the certificate validation in SSL/TLS implementations.

To conclude, there are advantages and positive effects of the present invention. In the present invention, the generation of test cases is guided by the RFC rules, meanwhile the information related to the obeying or violation of rules of the test cases is obtained. The information is used to indicate the reason for the occurrence of the discrepancy in the analysis of the test results and calculate the information such as bug number etc. Therefore, the drawbacks of the traditional differential testing method can be eliminated, the testing is more efficient, and the bugs and security vulnerability in SSL/TLS implementation are found.

Compared with the prior art, the present invention has the following advantages:

(1) Whenever a discrepancy is found, the related information of the test cases shows that which SSL/TLS implementations make mistakes and which RFC rules are violated. This is helpful in fixing bugs of SSL/TLS implementations.

(2) When a single SSL/TLS implementation is tested, traditional differential testing does not work but the present invention still works normally.

(3) In the experiment, 89 digital certificates have been generated. With these certificates, 29 bugs on average in each of the 14 different SSL/TLS implementations have been found. So far, 1 reported security vulnerability (CVE-2017-5066) has been confirmed and fixed by Google, 8 bugs have been confirmed by Microsoft, GnuTLS, and wolfSSL. The experimental results show that the present invention significantly improves the testing efficiency. Moreover, bugs and security vulnerabilities in SSL/TLS implementations can be found by the present invention.

DETAILED DESCRIPTION

In order to clarify the objectives, technical solutions, and advantages of the present invention, the present invention will be further described in detail with reference to the embodiments. The specific embodiments described herein are used to explain the present invention rather than limit the present invention.

The present invention relates to the implementation and differential testing of Secure Sockets Layer (SSL)/Transport Layer Security (TLS). Specifically, the present invention relates to "Request For Comments" (RFC) directed differential testing method of the certificate validation in SSL/TLS implementations. The present invention is mainly used in the testing of the certificate validation in SSL/TLS implementations, and finds the potential software bugs or security vulnerabilities, thereby improving the correctness and security of SSL/TLS implementations.

Figures 1, 2:
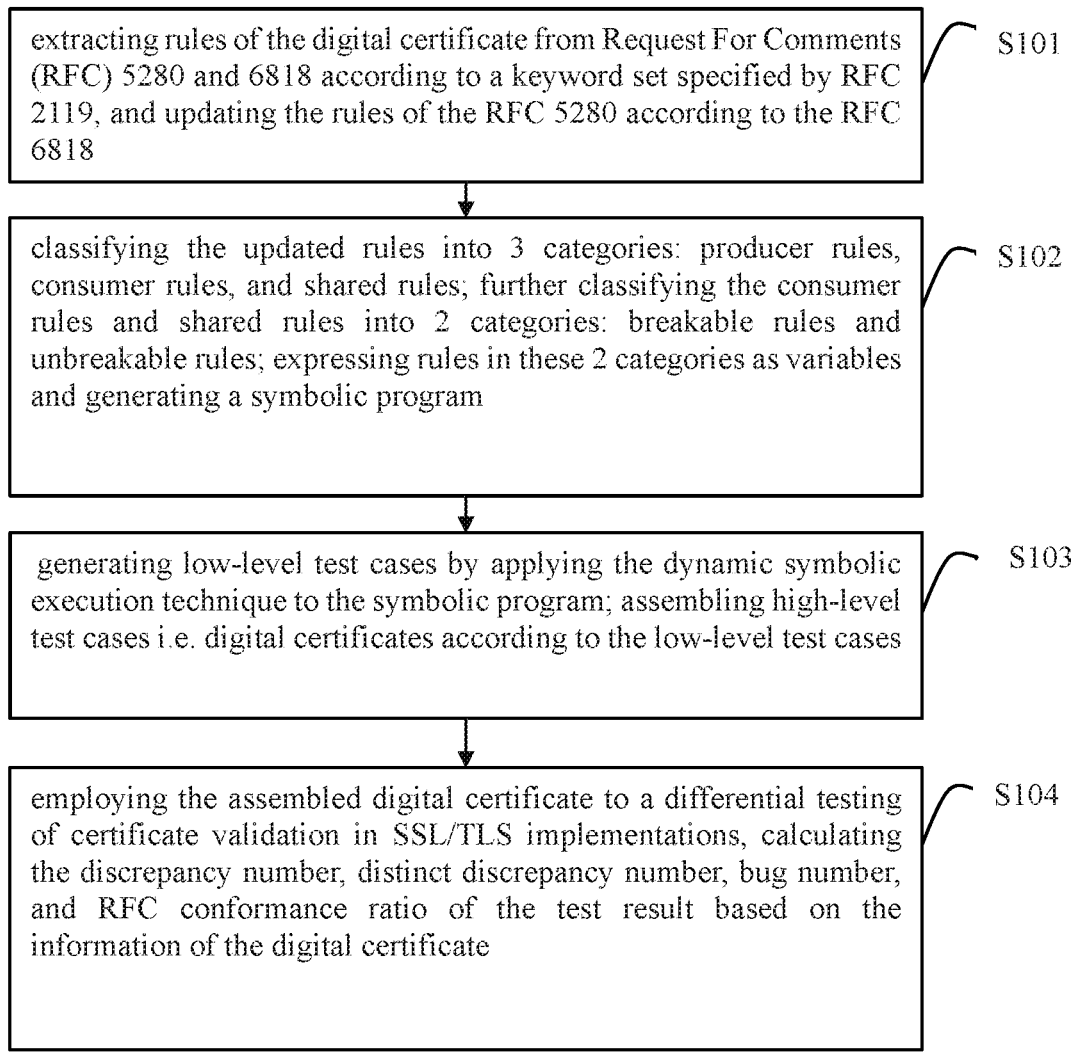
FIG. 1 is a flowchart showing an RFC-directed differential testing method of a certificate validation in SSL/TLS implementations according to an embodiment of the present invention.
FIG. 2 is a schematic diagram showing an overall structure of the digital certificate according to an embodiment of the present invention.

As shown in FIG. 1, the RFC-directed differential testing method of the certificate validation in SSL/TLS implementations provided by the embodiment of the present invention includes:

S101: extracting the rules of the digital certificate from "Request For Comments" (RFC) 5280 and 6818 according to the keyword set specified by RFC 2119 and updating the rules of RFC 5280 according to RFC 6818;

S102: classifying the updated rules into three categories including producer rules, consumer rules, and shared rules; and further classifying the consumer rules and shared rules into two categories including breakable rules and unbreakable rules; and finally, expressing the rules of these two categories as variables and generating a symbolic program;

S103: generating low-level test cases by applying the dynamic symbolic execution technique to the symbolic program and assembling high-level test cases i.e. digital certificates according to the low-level test cases;

S104: employing assembled digital certificates to a differential testing of certificate validation in SSL/TLS implementations and calculating a discrepancy number, a distinct discrepancy number, a bug number, and an RFC conformance ratio in the test results based on information of the digital certificates. The principle of application of the present invention will be further described hereinafter with reference to the drawings.

In the present invention, the generation of the digital certificates is guided by the RFC rules based on the RFC standards of the digital certificate. The digital certificate and the information of its conformity or violation of the RFC rules are employed to the differential testing and result analysis of the certificate validation in SSL/TLS implementations, respectively. Therefore, the problems in the prior art are solved and the testing is more efficient.

FIG. 2 shows the overall structure of a digital certificate. A digital certificate consists of three parts: the "to-be-signed" digital certificate (tbsCertificate), the signature algorithm, and the signature value. The tbsCertificate consists of a version (number), a serial number, a signature, a validity, an issuer, an issuer unique identifier, a subject, a subject unique identifier, a subject public key information and the extensions.

Figures 3, 4:
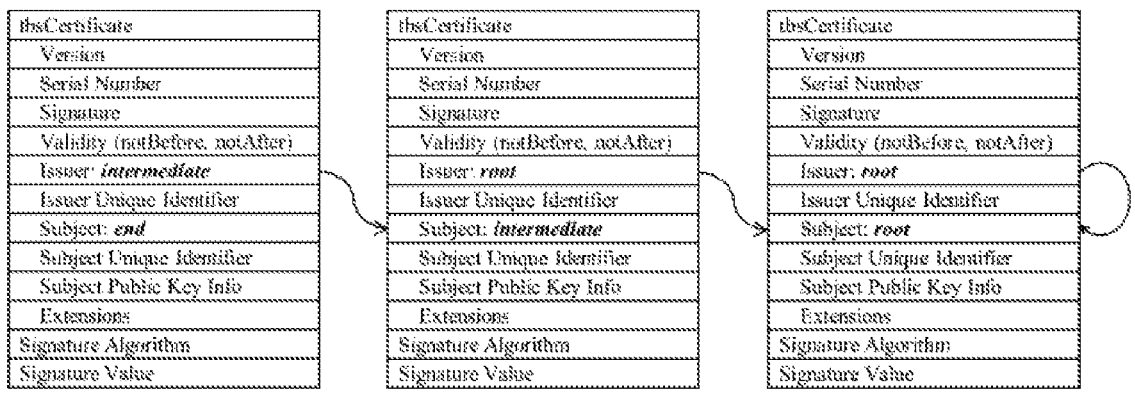
FIG. 3 is a detailed structural schematic diagram of extensions in a digital certificate according to an embodiment of the present invention.
FIG. 4 is a schematic diagram of a simple digital certificate chain according to an embodiment of the present invention.

FIG. 3 shows a detailed structure of the extensions in the digital certificate. Extensions consist of standard extensions and private Internet extensions. Standard extensions consist of the following items: authority key identifier, subject key identifier, key usage, certificate policies, policy mappings, subject alternative name, issuer alternative name, subject directory attributes, basic constraints, name constraints, policy constraints, extended key usage, certificate revocation list (CRL) distribution points, inhibit any Policy, and the freshest digital certificate revocation list. The private Internet extensions consist of authority information access and subject information access.

FIG. 4 depicts a simple digital certificate chain. To validate the digital certificate on the left in FIG. 4, two aspects need to be checked. The first aspect is to check whether or not the tbsCertificate of the digital certificate has been tampered with based on the signature algorithm and signature value of the digital certificate. If the tbsCertificate has not been tampered with, then the constraints of the certificate such as validity etc. are then checked. On the other hand, the digital certificate of the corresponding subject (i.e. the digital certificate in FIG. 4) is found according to the issuer of the digital certificate and the legitimacy of the certificate has been checked, and this process is continued until a valid root digital certificate is found (i.e. the digital certificate on the right of FIG. 4). If both of these two checks pass, the current digital certificate is accepted, otherwise it is rejected.

Figure 5:
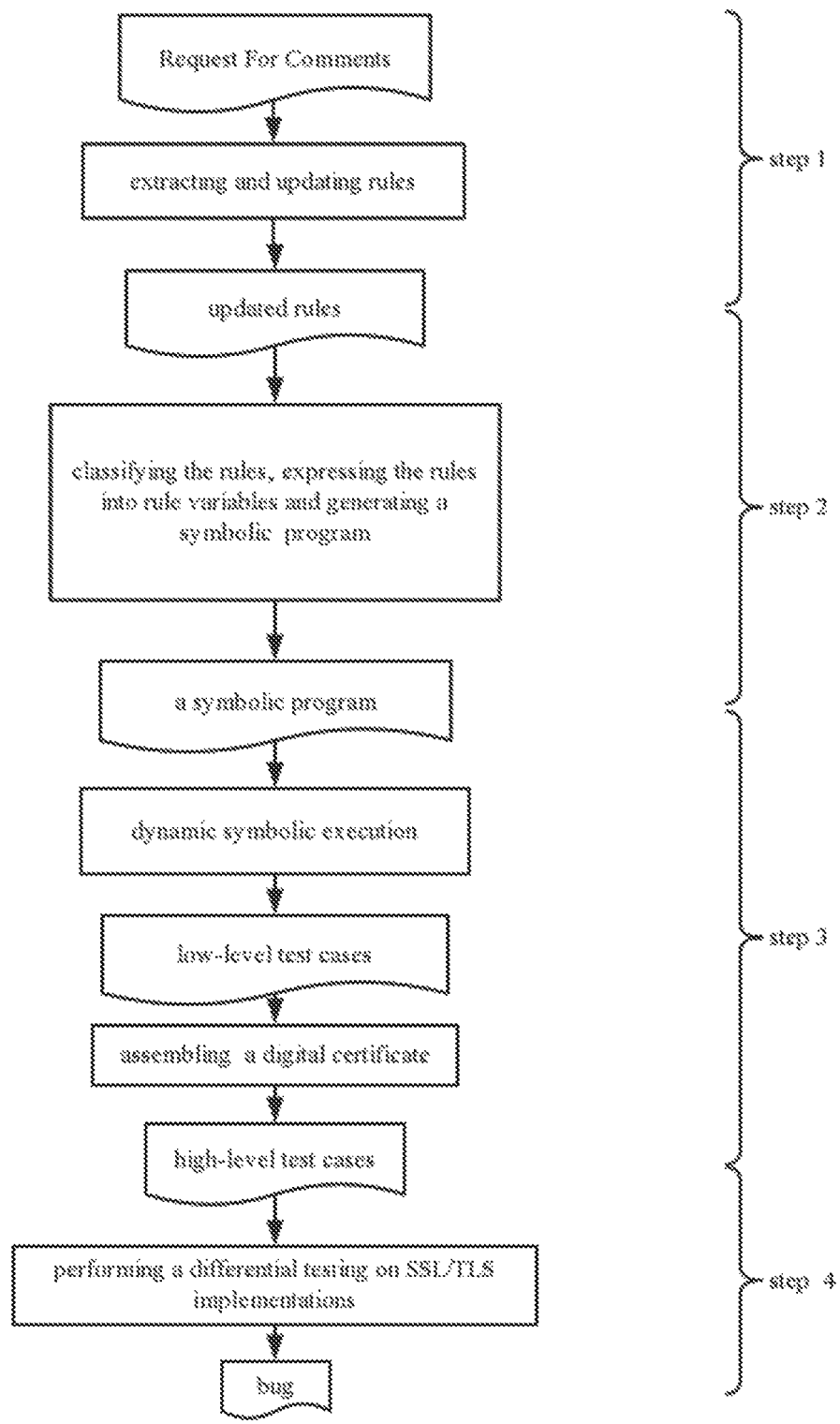
FIG. 5 is a schematic diagram of an overall process of an RFC-directed differential testing of certificate validation module in SSL/TLS implementations according to an embodiment of the present invention.

As shown in FIG. 5, the differential testing method of certificate validation in SSL/TLS implementations provided by the embodiment of the present invention specifically includes:

Step 1: extracting the rules of digital certificates from RFCs 5280 and 6818 according to the keyword set specified in RFC 2119 and updating the rules of RFC 5280 according to RFC 6818, which specifically includes the following steps:

(1) extracting the rules of digital certificate from RFCs 5280 and 6818 according to the keyword set required to be obeyed in writing the RFCs specified in RFC 2119; wherein page breaks, headers, footers, and redundant blank lines in the text of RCF 5280 or RFC 6818 i.e. rfc5280.txt or rfc6818.txt are deleted and the text after deletion is recorded as R;

R is split into sections according to Level 1 titles;

for each of the sections from Section 4 to 8 in RFC 5280 and Section 2 to 8 in RFC 6818, first, the rule set variable ruleSet is set as null set and the rule number ruleNum is set as 0; then English sentences in the content between arbitrary j-level title ($1 \leq j \leq 5$) of RFC 5280, any j-level title ($1 \leq j \leq 2$) of RFC 6818 and the next title thereof are extracted according to ".\n" and ".", while the structure represented by Abstract Syntax Notation One (ASN.1) is extracted according to "::=", "::={ln . . . }ln" and "::={ln . . . }ln'", where "::=", "::={ln . . . }ln" and "::={ln . . . }ln'" respectively represent no left and right braces, having left and right braces which are in the same row, and having left and right brace which are not in the same row in the ASN.1 structure definition;

whether the keywords specified in RFC 2119 are contained is determined for each English sentence and each ASN.1 structure, and if the keywords are contained, then the sentence or structure is a rule which is recorded as "s", meanwhile, ruleNum is added by 1, ruleNum, the j-level title and the rule a constitute a triple s'=(ruleNum,Title j, s); the s' is added in ruleSet; and ruleSet is saved as a text file in the end;

(2) updating the rules of RFC 5280 according to RFC 6818; wherein, the rules in a respective section are respectively added to an obsolete rule set obRuleSet and an updated rule set upRuleSet according to a characteristic of RFC 6818 in which the marks " . . . says:", " . . . replaced with:" and "add(ed) . . . " indicate obsolete, updated, and additional paragraphs, respectively; then, word sets word-$Set_r$ that constitute each rule r is calculated, and a word set difference of any two rules $r_1$ and $r_2$ is calculated i.e. $Matrix[r_1,r_2]=|wordSet_{r_1}-wordSet_{r_2}|$; finally, each rule o in obRuleSet is calculated as follows: finding out the u that makes Matrix[o,u] have the smallest value by calculation from all of the u in upRuleSet, and the u obtained is assigned to the updated rule recorded as $Update_o$ of rule o, $$Update_o = \arg\min_u(Matrix[o, u]),$$

if such Matrix[o,u] does not exist, it indicates that the rule o is discarded i.e. $Update_o$=discarded, if Matrix[o,u]=Matrix[u,o]=0, it indicates that the rule o is not changed i.e. $Update_o$=unchanged, otherwise, the rule u is used to update rule o i.e. $Update_o$=u, and the rule o of RFC 5280 is updated by $Update_o$;

Step 2: classifying the updated rules into three categories: producer rules, consumer rules, and shared rules, and further classifying the consumer rules and shared rules into breakable rules and unbreakable rules, then expressing the rules as variables and generating a symbolic program, which specifically includes the following steps:

(1) classifying the updated rules into three categories: producer rules, consumer rules, and shared rules;

wherein, the producer rule set producerRuleSet, consumer rule set consumerRuleSet, and shared rule set sharedRuleSet are set as null sets, respectively;

for each rule r in the updated rule set updatedRuleSet of RFC 5280 and any pattern m in a pattern set of the producer rules, if r matches with m, then r is added to producerRuleSet; for any pattern m' in a pattern set of consumer rules, if r matches with m', then r is added to consumerRuleSet;

the shared rule set is an intersection set of the producer rule set and the consumer rule i.e. sharedRuleSet= producerRuleSet∩consumerRuleSet; the shared rule set is removed from the producer rule set and the consumer rule set producerRuleSet−=sharedRuleSet and consumerRuleSet−=sharedRuleSet; the rules excluding the producer rules and consumer rules i.e. updatedRuleSet−producerRuleSet−consumerRuleSet are finally collected as shared rules;

(2) the consumer rules and shared rules are further classified into breakable rules and unbreakable rules;

wherein a breakable rule set breakableRuleSet, an unbreakable rule set unbreakableRuleSet, and a pattern set of the unbreakable rules patternSet are set as null sets, respectively;

for any keyword m in the keyword set specified in RFC 2119 and any unbreakable rule pattern u, m+" "+u is added to patternSet;

for any rule r in a consumer rule and shared rule set csrSet and any pattern p in patternSet, if r matches with p, then r is added to unbreakableRuleSet; and the unbreakable rule set is calculated according to breakableRuleSet=csrSet−unbreakableRuleSet;

(3) expressing breakable rules and unbreakable rules as variables;

wherein, a response set responseSet, and other reserved word set otherSet, and a rule variable set varSet are set as null sets; the keywords specified in RFC 2119 are added to a keyword set modalKeywordSet, words representing sentence structures are added to a sentence structure pattern set sentencePatterns, the words representing logical relationships are added to a logic pattern set logicPatterns, the words representing responses are added to a response pattern set responsePatterns, digital patterns are added to another reserved word pattern set otherPatterns, and the names and variations of digital certificate components are added to a component name set componentSet;

for any keyword m in modalKeywordSet and any response pattern rp in responsePatterns, the words after m+" "+rp in each unbreakable rule and breakable rule r are added to responseSet; the words in r that matches with any pattern p in otherPatterns are added to otherSet;

a reserved word set reservedSet is the union set of modalKeywordSet, sentencePatterns, logicPatterns, componentSet, responseSet, and otherSet;

for each unbreakable rule and breakable rule r, the words in r that do not belong to reservedSet are deleted to obtain r';

for any r', if r' is expressed by natural language, then all conditions expressed by the rule are obtained according to its syntax structure; for each condition, first condition="$c_1$, $v_1$, . . . , $c_i$, $v_i$" is obtained, wherein $c_1$, . . . , $c_i$ are names of the components involved in this condition, $v_1$, . . . , $v_i$ are values of the corresponding components, $i \in \mathbb{N}$; if r' is an unbreakable rule, and if there is a response part, then the response response="consumer,actions" is obtained; condition[+":"+response] is added to varSet, wherein square brackets represent that when there is a response, it is indicated by condition+":"+response, otherwise it is indicated by condition; if r' is the breakable rule, and if there is a result part, then the result result="$c_1$, $v_1$, . . . , $c_j$, $v_j$" is obtained; condition[+":"+result] is added to varSet, wherein the square brackets represent that when there is a result, it is indicated by condition+":"+result, otherwise it is indicated by condition;

for any r', if r' is expressed by ASN.1, and if there is an embedded constraint t for each optional component c, then a constraint of c is constraint$_c$={"c,absent",t}; if there is no embedded constraint, then constraint$_c$={"c,absent", "c, present"}; for each non-optional component c', its constraint is constraint$_{c'}$={"c,validValue"}; the constraints of r' are combined and added to varSet;

for each constraint in varSet, commas and colons ("," and ":") are replaced by single underscore and double underscores ("_" and "__") respectively;

(4) forming a symbolic program in DSE technology by using the rule variables; wherein "# include <stdio.h>", "# include <klee/klee.h>" and "int main ( ){"" are produced;

variable declarations are produced for rule variables;

the rule variables corresponding to the unbreakable rules and breakable rules are symbolized, respectively;

"if (v>0) printf ("v>0") else" is produced for the rule variable v corresponding to the unbreakable rule;

"if (v'<0) printf ("v'<0") else" is produced for the rule variable v' corresponding to the breakable rule;

the redundant "else" is deleted and "}" is added; and a file C is saved.

Step 3: generating low-level test cases by applying the dynamic symbolic execution technique to the symbolic program and assembling high-level test cases i.e. digital certificates according to the low-level test cases, which specifically includes the following steps:

(1) processing the symbolic program by using DSE technology;

(2) saving the low-level test cases produced by the DSE as a text file by a redirection technology;

(3) reserving rule variables with non-zero value and replacing 2147483647 and −2147483648 with 1 and −1 respectively for each text file and deleting empty text files;

(4) setting valid values for basic components of the digital certificate;

(5) setting valid values for the components of basicConstraints and keyUsage if a certificate of a certification authority is being assembled;

(6) setting a value of a component in a condition part of the low-level test case according to a corresponding value requirement of the condition part;

(7) leaving the response part of the low-level test case for observation without any processing and setting a value required in violating the result part for the components in the result part of the low-level test case;

(8) signing tbsCertificate a signature by using a signature algorithm of signature in tbsCertificate if signatureAlgorithm has not been set yet;

(9) encoding the certificate and saving it as a digital certificate file;

Step 4: employing assembled digital certificates to a differential testing of certificate validation in SSL/TLS implementations and calculating a discrepancy number, a distinct discrepancy number, a bug number, and an RFC conformance ratio in the test results based on information of the digital certificates, which specifically includes the following steps:

(1) employing the assembled digital certificate in the differential testing of certificate validation in SSL/TLS implementations;

(2) calculating the discrepancy number, the distinct discrepancy number, the bug number, and the RFC conformance ratio in the test result by using the information formed during an assembly of the digital certificate;

wherein, specific RFC rules that are obeyed or violated by the digital certificate are then resolved during the assembly of the digital certificate, so an (m+3)-dimension vector $$\overrightarrow{RFCcert} = \langle SN, RFCreason, RFCresult, ResultI_1, \ldots, ResultI_m \rangle$$ may be formed;

where, SN is a serial number of the digital certificate; RFCreason records the RFC rules that are obeyed or violated by the digital certificate; RFCresult represents whether the digital certificate should be accepted or rejected according to the RFC rules; $ResultI_i$ ($1 \leq i \leq m$) represents whether the digital certificate should be accepted or rejected by the $i^{th}$ SSL/TLS implementation being tested; the discrepancy number, the distinct discrepancy number, and the bug number in the test result may be calculated based on the information:

1) for any digital certificate, if there are SSL/TLS implementations $I_i$ and $I_j$ which make $ResultI_i \neq ResultI_j$, then a discrepancy is found in the test result;

2) for all the digital certificates that generate discrepancies, if the vector $\langle ResultI_1, \ldots, ResultI_m \rangle_x$ of a digital certificate x is different from the vector $\langle ResultI_1, \ldots, ResultI_m \rangle_y$ of any other digital certificate y, then a distinct discrepancy is found in the test result;

3) if RFCresult shows that the acceptance or rejection of the digital certificate are all in accordance with the RFC rules, then the discrepancy is invalid;

4) if $ResultI_i$ ($1 \le i \le m$) does not match with RFCresult, then a bug in SSL/TLS implementations is found, and RFCreason provides a reason for an occurrence of the bug;

the RFC conformance ratio (CR) of the $i^{th}$ SSL/TLS implementation is calculated by the following formula;

$$CR(i) = \frac{|RFCresult \text{ matches } ResultI_i|}{|certs|} \times 100\%$$

where, $|RFCresult \text{ matches } ResultI_i|$ is the number of result complying with the RFC in the test result, $|certs|$ is the number of the vector $\overrightarrow{RFCcert}$ in the testing.

The application effects of the present invention will be further described below with reference to specific embodiments.

Embodiment 1

The generations of 3 digital certificates directed by 3 RFC rules and the differential testing of SSL/TLS implementations are taken as the embodiment to describe the steps of the present invention hereinafter. The specific steps are as follows:

Step 1: first, the rules of the digital certificate are extracted from RFCs 5280 and 6818 according to the keyword set required to be obeyed in writing RFCs as specified in RFC 2119 and the rules of RFC 5280 are updated according to RFC 6818. The specific implementation is as follows.

(1) The rules of the digital certificate are extracted from RFCs 5280 and 6818 according to the keyword set modalKeywordSet, i.e. {MUST, MUST NOT, SHALL, SHALL NOT, REQUIRED, SHOULD, SHOULD NOT, RECOMMENDED, NOT RECOMMENDED, MAY, OPTIONAL}, which is required to be obeyed in writing RFC as specified in RFC 2119.

The page breaks, headers, footers and redundant blank lines in the text of RFC 5280 (or RFC 6818) i.e. rfc5280.txt (or rfc6818.txt) are deleted and the file after deletion is recorded as R.

R is split into sections according to Level 1 titles. For RFC 5280, the sections are Section 1 to Section 11 and Appendix A to C, respectively. For RFC 6818, the sections are Section 1 to Section 10, respectively.

For Section 4 in RFC 5280, the rule set variable ruleSet is set as null set and rule number ruleNum is set as 0. Then, for the content between the Level 2 title "4.2 Certificate Extensions" and the next title "4.2.1 Standard Extensions", the English sentences are extracted according to ".\n" and ".". Whether the keywords specified in RFC 2119 are contained is determined for each English sentence, if the keywords are contained, this sentence is a rule. For example, the following sentence contains the keyword "SHOULD", then the sentence is a rule.

Rule 1: "In addition, applications conforming to this profile SHOULD recognize the authority and subject key identifier and policy mappings extensions."

At this time, ruleNum is added by 1, a triple s'=(1, Certificate Extensions, s) is constituted by ruleNum, the Level 2 title, and the rule s, and s' is added to ruleSet.

Similarly, the following Rule 2 (recorded as s) is extracted from the content between the Level 4 title "4.2.1.4 Certificate Policies" and the next title "4.2.1.5 Policy Mappings".

Rule 2: "Therefore, certificate users SHOULD gracefully handle explicit Text with more than 200 characters."

s'=(2, Certificate Policies, s) is added to ruleSet, and the ruleSet is saved as a text file in the end.

For Section 5 of RFC 5280, the following Rule 3 may be extracted.

Rule 3: "This field MUST contain the same algorithm identifier as the signature field in the sequence tbsCertificate."

(2) The rules of RFC 5280 are updated according to RFC 6818.

" . . . says:" in Section 3 of RFC 6818 indicates the obsolete ruleset obRuleSet of obsolete paragraphs, which specifically includes:

Rule $o_1$: "Conforming CAs SHOULD use the UTF8String encoding for explicitText, but MAY use IA5String."

Rule $o_2$: "Conforming CAs MUST NOT encode explicitText as VisibleString or BMPString."

Rule $o_3$: "The explicitText string SHOULD NOT include any control characters (e.g., U+0000 to U+001F and U+007F to U+009F)."

Rule $o_4$: "When the UTF8String encoding is used, all character sequences SHOULD be normalized according to Unicode normalization form C (NFC)[NFC]."

" . . . replaced with:" in Section 3 of RFC 6818 indicates the updated rule set upRuleSet of the updated paragraphs, which specifically includes:

Rule $u_1$: "Conforming CAs SHOULD use the UTF8String encoding for explicitText."

Rule $u_2$: "Conforming CAs MUST NOT encode explicitText as IA5String."

Rule $u_3$: "The explicitText string SHOULD NOT include any control characters (e.g., U+0000 to U+001F and U+007F to U+009F)."

Rule $u_4$: "When the UTF8String or BMPString encoding is used, all character sequences SHOULD be normalized according to Unicode normalization form C (NFC) [NFC]."

The $wordSet_{o_1}$ of rule $o_1$ is taken as an example to illustrate the calculation of the word set of each rule. $wordSet_{o_1}$ is the set {Conforming, CAs, SHOULD, use, the, UTF8String, encoding, for, explicitText, but, MAY, IA5String}. The calculation of $Matrix[r_1, r_2]=|wordSet_{r_1}-wordSet_{r_2}|$ of any two rules $r_1$ and $r_2$ are illustrated by taking rule $o_1$ and rule $u_1$ as examples. $Matrix[o_1,u_1]=|wordSet_{o_1}-wordSet_{u_1}|$ represents the element number of the set {but, MAY, IA5String} i.e. 3, and this element number is the smallest one in $\{Matrix[o_1, u_1], Matrix[o_1, u_2], Matrix[o_1, u_3], Matrix[o_1, u_4]\}$, then $Update_{o_1}=u_1$. Similarly, $Update_{o_2}=u_2$ and $Update_{o_4}=u_4$ may be obtained. Since $Matrix[o_3, u_3]=Matrix[u_3, o_3]=0$, $Update_{o_3}=$unchanged.

Sections 5 and 6 of RFC 6818 are processed in the same way. It should be noted that Section 4 does not include RFC rules, therefore Section 4 would not be processed.

Rule o of RFC 5280 is updated by $Update_o$. Since Rule 1, Rule 2, and Rule 3 are not updated, they remain unchanged.

Step 2: the updated rules are classified into three categories: producer rules, consumer rules, and shared rules. The consumer rules and the shared rules are further classified into breakable rules and unbreakable rules. The rules are expressed as variables and a symbolic program is generated. The specific implementation is as follows.

(1) The updated rules are classified into three categories: producer rules, consumer rules, and shared rules.

Producer rule set producerRuleSet, consumer rule set consumerRuleSet, and shared rule set sharedRuleSet are set as null sets, respectively.

Rule 1 matches with the "applications conforming to this profile" in the pattern set of consumer rules, thus Rule 1 is added to r. Rule 2 matches with the "certificate users" in the pattern set of consumer rules, thus Rule 2 is added to updatedRuleSet. Rule 3 does not match with any pattern, so Rule 3 is neither added to producerRuleSet nor consumerRuleSet.

In this embodiment, the shared rule set is an intersection set of the producer rule set and the consumer rule set, i.e., a null set. The producer rule set and the consumer rule set remain the original set after the shared rule set is respectively removed. Finally, rules excluding the producer rules and the consumer rules i.e. r are collected as shared rules, i.e.: {Rule 1, Rule 2, Rule 3} minus null set then minus {Rule 1, Rule 2} to obtain the shared rule set {Rule 3}.

(2) The consumer rules and shared rules are further classified into two categories: breakable rules and unbreakable rules.

The breakable rule set breakableRuleSet, the unbreakable rule set unbreakableRuleSet, and the pattern set of the unbreakable rules patternSet are set are null sets, respectively.

For any keyword m in the keyword set specified in RFC 2119 and any unbreakable rule pattern u, m+" "+u is added to patternSet.

Rule 1 matches with pattern "SHOULD recognize", Rule 2 matches with pattern "SHOULD gracefully handle", thus Rules 1 and 2 are added to unbreakableRuleSet. Rule 3 does not match with any pattern, thus Rule 3 is added to breakableRuleSet.

Calculation of breakable rule set: {Rule 1, Rule 2, Rule 3}−{Rule 1, Rule 2}={Rule 3}.

(3) The breakable rules and unbreakable rules are expressed as variables.

The response set responseSet, other reserved word set otherSet, and rule variable set varSet are set as null sets. The keyword set modalKeywordSet specified in RFC 2119 is obtained. The words representing the sentence structures are added to the sentence structure pattern set SentencePatterns, the words representing the logical relationships are added to the logic pattern setlogicPatterns, the words representing the responses are added to the response pattern set responsePatterns, the number patterns etc. are added to the other reserved word pattern set otherPatterns, and the names and variations of the digital certificate component are added to the component name set componentSet.

For Rule 1, Rule 2 and Rule 3, "recognize", "handle" and "contain" are added responseSet," "200" that matches with number pattern is added to otherSet.

The reserved word set reservedSet is an union set of modalKeywordSet, SentencePatterns, logicPatterns, componentSet, responseSet, and otherSet.

The following rules are obtained by deleting the words that do not belong to reservedSet for Rule 1, Rule 2 and Rule 3, respectively.

Rule 1': "applications SHOULD recognize authority and subject key identifier and policy mappings."

Rule 2': "certificate users SHOULD handle explicitText with more than 200 characters."

Rule 3': "signatureAlgorithm MUST same as signature in tbsCertificate."

It should be noted that the pronoun "This" in Rule 3 is replaced by the variant "signatureAlgorithm" of the title "signature algorithm" that Rule 3 belongs to.

Rules 1', 2' and 3' merely represent one case, respectively. As for Rule 1', the condition is "authorityKeyIdentifier, present, subjectKeyIdentifier, present, policyMappings, present". Since Rule 1' is an unbreakable rule, it has a response which is "applications, SHOULD recognize", "authorityKeyIdentifier, present, subjectKeyIdentifier, present, policyMappings, present: applications, SHOULDrecognize" is added to varSet. As for Rule 2, the condition is "explicitText, morthan200chars". Since rule 2' is an unbreakable rule, it has a response which is "certUsers, SHOULD handle". The "explicitText, morthan200chars: certUsers, SHOULDhandle" is added to varSet. As for Rule 3', the condition is "tbsCertSignature, present". Since Rule 3' is a breakable rule, it has a result which is "signatureAlgorithm, MUSTsame". The "tbsCertSignature, present, signatureAlgorithm, MUSTsame" is added to varSet.

Since Rule 1, Rule 2, and Rule 3 are not expressed by ASN.1, this step is not performed.

The comma and colon ("," and ":") in the three constraints in varSet are replaced by the single underscore and double underscore ("_" and "__") respectively to obtain the following rule variables.

Rule variable 1: "authorityKeyIdentifier_present_subjectKeyIdentifier_present_policyMappings_present__applications_SHOULDrecognize".

Rule variable 2: "explicitText_morthan200chars_certUsers__SHOULD handle".

Rule variable 3: "tbsCertSignature_present__signatureAlgorithm_MUSTsame".

(4) Rule variables are utilized to form symbolic programs according to DSE technique.

"# include <stdio.h>", "# include <klee/klee.h>" and "int main ( ) {" are produced.

Variable declarations are produced for 3 rule variables.

"int authorityKeyIdentifier_present_subjectKeyIdentifier_present_policyMaps_present_applications_SHOULDrecognize, explicitText_morthan200chars_certUsers_SHOULDhandle, tbsCertSignature_present_signature Algorithm_MUSTsame;"

Rules variables corresponding to unbreakable rules (Rule 1 and Rule 2) and a breakable rule (Rule 3) are symbolized respectively.

"klee_make_symbolic(&authorityKeyIdentifier_present_subjectKeyIdentifier_present_policyMappings_present_applications_SHOULDrecognize, sizeof(authorityKeyIdentifier_present_subjectKeyIdentifier_present_policyMappings_present_applications_SHOULDrecognize)," authorityKeyIdentifier_present_subjectKeyIdentifier_present_policyMappings_present_applications_SHOULDrecognize";"

"klee_make_symbolic (&explicitText_morthan200chars_certUsers_SHOULDhandle, sizeof(explicitText_morthan200chars_certUsers_SHOULDhandle), "explicit Text_morthan200chars_certUsers_SHOULD handle";"

"klee_make_symbolic(&tbsCertSignature_present_signatureAlgorithm_MUSTsame, sizeof(tbsCertSignature_present_signatureAlgorithm_MUSTsame), "tbsCertSignature_present_signatureAlgorithm_MUSTsame";"

The following sentences are generated for the Rule variables 1 and 2 corresponding to the unbreakable rules.

```
"if (authorityKeyIdentifier_present_subjectKeyIdentifier_present_policyMappings_present
__applications_SHOULDrecognize>0) printf ("authorityKeyIdentifier_present_subjectKeyIden
tifier_present_policyMappings_present__applications_SHOULDrecognize>0");
  else
  if (explicitText_morthan200chars__certUsers_SHOULDhandle>0)
  printf("explicitText_morthan200chars__certUsers_SHOULDhandle>0")
  else.
```

The following sentences are generated for the Rule variable 3 corresponding to the breakable rule.

```
"if (tbsCertSignature_present__signatureAlgorithm_MUSTsame<0)
printf("tbsCertSignature_present_signatureAlgorithm_MUSTsame<0")
else".
```

The redundant "else" is deleted and "}" is added.

The symbolic program is saved as a .c file.

Step 3: four low-level test cases are generated by applying the DSE technique to the symbolic program, and whether the values of components in a digital certificate obey the RFC rules is indicated by each low-level test case. Three high-level test cases i.e. digital certificates are assembled according to three of the low-level test cases. The specific steps are as follows.

(1) The symbolic program is processed by the DSE technique to obtain 4 low-level test cases.

(2) For the sake of the subsequent processing, the 4 low-level test cases are saved as text files by redirection technology.

(3) For each low-level test case, merely the rule variables with a non-zero value are reserved, and 2147483647 and −2147483648 are respectively replaced with 1 and −1. Since the rule variables of one low-level test case all have non-zero values, this low-level test case is deleted, and merely three low-level test cases with content are reserved.

(4) Valid values for the basic components: version, serial number, validity, issuer, and subject are set.

(5) Since the low-level test cases corresponding to Rules 1, 2, and 3 does not consider the specifications of CA, this step is not performed.

(6) The values for the components in the condition part of the low-level test case are set according to the value requirements corresponding to the condition part. As for the condition part of the low-level test case corresponding to Rule 1, valid values should be set for the authority key identifier, subject key identifier, and policy mappings according to "authorityKeyIdentifier_present_subjectKeyIdentifier_present-policyMappings_present". As for the condition part of the low-level test case corresponding to Rule 2, a content with more than 200 characters should be set for explicit text according to "explicitText_morthan200chars". As for the condition part of the low-level test case corresponding to Rule 3, a signature algorithm name such as "SHA256RSA" should be set for the signature in tbsCertificate according to "tbsCertSignature_present".

(7) The response part of the low-level test case is reserved for observation without any processing, i.e. the response part "applications_SHOULDrecognize" of the low-level test case corresponding to Rule 1 and the response part "certUsers_SHOULDhandle" of the low-level test case corresponding to Rule 2 are reversed for observation. Values required in violating result part are set for the components in the result part of the low-level test case, i.e. as for the result part "signatureAlgorithm_MUSTsame" of the low-level test case corresponding to Rule 3, a different signature algorithm such as "SHAIRSA" should be set for the signature algorithm.

(8) If the signatureAlgorithm has not been set for the low-level test case corresponding to Rules 1 and 2, then it is set to be consistent with the signature in tbsCertificate. This step is not performed for the low-level test case corresponding to Rule 3.

(9) The certificate is BASE64-encoded and saved as a certificate with ".pem" format.

Step 4: The assembled digital certificate are employed in differential testing of certificate validation in 14 different SSL/TLS implementations. The 3 vectors corresponding to the 3 digital certificates are:

<1, R1, 2, 1, 1, 1, 1, 1, 1, 1, 0, 0, 0, 1, 1, 1, 1>;
<2, R2, 2, 1, 1, 1, 1, 1, 1, 1, 1, 1, 0, 1, 1, 1, 1>;
<3, R3, 0, 0, 0, 0, 0, 0, 0, 0, 1, 0, 0, 0, 0, 1, 1>.

It should be noted that: R1, R2 and R3 respectively represent Rule 1, Rule 2 and Rule 3. When a digital certificate is accepted by RFC, RFCresult is set as 1, when a digital certificate is rejected by RFC, RFCresult is set as 0, and when acceptance and rejection are both reasonable behaviors, RFCresult is set as 2. When a digital certificate is accepted by SSL/TLS, 1 is recorded, and when a digital certificate is rejected by SSL/TLS, 0 is recorded.

1) The 8th, 9th and 10th results of the digital certificate 1 i.e. 0 are different from other results i.e. 1; the 10th result of the digital certificate 2 i.e. 0 is different from other results i.e. 1; the 8th, 13th and 14th results of the digital certificate 3 i.e. 1 are different from other results i.e. 0. Therefore, discrepancies are found in all of the 3 digital certificates.

2) The test result vectors of these 3 digital certificates are:
<1, 1, 1, 1, 1, 1, 1, 0, 0, 0, 1, 1, 1, 1>;
<1, 1, 1, 1, 1, 1, 1, 1, 1, 0, 1, 1, 1, 1>;
<0, 0, 0, 0, 0, 0, 0, 1, 0, 0, 0, 0, 1, 1>.

They are different with each other, so there are 3 distinct discrepancies.

Since RFCresult of Digital certificates 1 and 2 are both 2, the Discrepancies 1 and 2 are invalid.

As for the test results of Digital certificate 3, the 8th, 13th and 14th test results of SSL/TLS implementations i.e. 1 are different from RFCresult i.e. 0, which indicates that the certificate validations in these three SSL/TLS implementations may have bugs, and the reason for the occurrence of the bug i.e. violation of Rule 3 is provided by RFCreasont. The 8th, 13th and 14th SSL/TLS implementations are NSS, Google Chrome, and Microsoft IE, respectively. According to the feedbacks of reporting the bugs to companies or organizations of these 3 SSL/TLS implementations, Google confirmed that the bug is a security vulnerability and fixed it, and Microsoft confirmed the bug.

Take the RFC conformance ratio (CR) of the 13th SSL/TLS implementation i.e. Chrome as an example.

$$CR(13) = 2/3 \times 100 \approx 66.67\%$$

wherein, the number of test results in the Chrome that are consistent with the RFC is 2, Chrome was tested for 3 times.

In summary, the present invention relates to the technical field of computer software analysis and discloses an RFC-directed differential testing method of the certificate validation in SSL/TLS implementations which includes: extracting rules from the RFC and updating the rules; classifying the rules; expressing the rules as variables; and generating a symbolic program; generating low-level test cases by applying dynamic symbolic execution technique to symbolic programs; assembling high-level test cases i.e. digital certificates according to low-level test cases; and employing the assembled digital certificates in the differential testing on the certificate validation in SSL/TLS implementations. In the present invention, efficient differential testing is performed on the program to be tested by generating discrepancy-oriented digital certificates. The present invention is applied to the testing of the certificate validation in SSL/TLS implementations, in order to discover potential software bugs or security vulnerabilities, thereby improving the correctness and safety of SSL/TLS implementations.

The above mentioned are merely preferred embodiments of the present invention and are not intended to limit the present invention. Any modification, equivalent substitution, and improvement derived within the spirit and principle of the present invention should be considered as falling within the scope of the present invention.

The invention claimed is:

1. An Request For Comments (RFC) -directed differential testing method of a certificate validation in Secure Sockets Layer /Transport Layer Security (SSL/TLS) implementations comprising:

classifying rules;

expressing the rules as variables;

generating a first Certificate Authority certificate first-level test cases;

generating a symbolic program, wherein generating the first Certificate Authority certificate first-level test cases by applying a dynamic symbolic execution technique to the symbolic program and assembling a second Certificate Authority certificate second-level test cases according to the first Certificate Authority certificate first-level test cases to obtain an assembled digital certificates, wherein the second Certificate Authority certificate second-level test cases are digital certificates; processing the symbolic program by using a DSE technology; saving the first Certificate Authority certificate first-level test cases produced by the Dynamic Symbolic Execution (DSE) as a text file by a redirection technology; reserving rule variables with non-zero values, replacing 2147483647 and −2147483648 with 1 and −1, respectively, for each text file, and deleting empty text files; setting a valid value for a basic component of the digital certificates; setting valid values for the components of basicConstraints and keyUsage if a certificate of a certification authority is being assembled; setting a value of a component in a condition part of the first Certificate Authority certificate first-level test cases according to a corresponding value requirement of the condition part; leaving a response part of the first Certificate Authority certificate first-level test cases for observation without any processing and setting a value required in violating a result part for a component in the result part of the first Certificate Authority certificate first-level test cases; signing tbsCertificate a signature by using a signature algorithm of signature in tbsCertificate if signatureAlgorithm has not been set yet; and encoding the certificate and saving it as a digital certificate file;

assembling the second Certificate Authority certificate second-level cases according to the first Certificate Authority certificate first-level test cases to obtain the assembled digital certificates; and employing the assembled digital certificates to a differential testing of the certificate validation in SSL/TLS implementations;

extracting rules of a digital certificate from RFCs 5280 and 6818 according to a keyword set specified in RFC 2119 and updating rules of RFC 5280 according to RFC 6818 to obtain updated rules;

classifying the updated rules into three categories: producer rules, consumer rules, and shared rules, further classifying the consumer rules and the shared rules into breakable rules and unbreakable rules, expressing the updated rules as variables, and generating the symbolic program;

employing the assembled digital certificates to the differential testing of the certificate validation in SSL/TLS implementations and calculating a discrepancy number, a distinct discrepancy number, a bug number, and an RFC conformance ratio in test results based on information of the assembled digital certificates;

if RFCresult shows that an acceptance or rejection of the digital certificate are all in accordance with the RFC rules, then the discrepancy is invalid;

if ResultI$_i$ (1≤i≤m) does not match with RFCresult, then a bug in SSL/TLS implementations is found, and RFCreason provides a reason for an occurrence of the bug;

an RFC conformance ratio of the i$^{th}$ SSL/TLS implementation is calculated by the following formula:

$$CR(i) = \frac{|RFCresult \text{ matches } ResultI_i|}{|certs|} \times 100\%,$$

wherein |RFCresult matches ResultI$_i$| is a number of results complying with the RFC in the test results, |certs| is a number of a vector $\overrightarrow{RFCcert}$ in the testing, RFCcert is a number of vector in the testing for validation with an assigned value by the Certificate Authority.

2. The RFC-directed differential testing method of the certificate validation in SSL/TLS implementations of claim 1 further comprises:

(1) extracting the rules of the digital certificate from RFCs 5280 and 6818 according to a keyword set required to be obeyed in writing RFC specified in RFC 2119; wherein page breaks, headers, footers, and redundant blank lines in a text of RCF 5280 or RFC 6818 are deleted and a text after deletion is recorded as R; R is split into a plurality of sections according to Level 1 titles; for each of the plurality of sections from Section 4 to 8 in RFC 5280 and Section 2 to 8 in RFC 6818, a rule set variable ruleSet is set as a null set and a rule number ruleNum is set as 0; then an English sentence in a content between arbitrary j-level title (1≤j≤5) of RFC 5280, arbitrary j-level title (1≤j≤2) of RFC 6818 and the next title thereof are extracted according to ".\n" and ".", a structure represented by Abstract Syntax Notation One (ASN.1) is extracted according to "::=", "::={ln . . . }ln" and "::={ln . . . }ln'", wherein "::=", "::={ln . . . }ln" and "::={ln . . . }ln'" respectively represent no left and right braces, having left and right braces which are in the same row, and having left and right brace which are not in the same row in an ASN.1 structure definition; whether keywords specified in RFC 2119 are contained is determined for each English sentence and each ASN.1 structure, if keywords are contained, then the sentence or structure is a rule which is recorded as s, meanwhile, ruleNum is added by 1, ruleNum, the j-level title, and the rule s constitute a triple s'=(ruleNum, Title j, s); the s' is added in ruleSet; and ruleSet is saved as a text file;

(2) updating the rules of RFC 5280 according to RFC 6818; wherein the rules in a respective section are respectively added to an obsolete rule set obRuleSet and an updated rule set upRuleSet according to a characteristic of RFC 6818 in which marks ". . . says:", ". . . replaced with: " and "add(ed). . . " indicate obsolete, updated, and additional paragraphs, respectively; then, a word set wordSet$_r$ that constitute each rule r is calculated, and a word set difference of any two rules $r_1$ and $r_2$ is calculated i.e. Matrix|$r_1$, $r_2$|=|wordSet$_{r2}$|; finally, each rule o in obRuleSet is calculated as follows: finding out the u that makes Matrix[o,u], have the smallest value by calculation from all of the u in upRuleSet, and the u obtained is assigned to the updated rule recorded as Update$_o$ of rule o, Update$_o$=arg min$_u$(Matrix[o,u]), if such Matrix[o,u] does not exist, the rule o is discarded so Update$_0$=discarded, if Matrix[o,u]=Matrix[u,o]=0, the rule o is not changed, so Update$_o$=unchanged, otherwise, the rule u is used to update the rule o so Update$_o$=u, and the rule o of RFC 5280 is updated by Update$_o$;

wherein the upRuleSet and the updated RuleSet are sets of rules that modifiable with regards to a certificate validation test case, wherein the breakableRuleSet and unbreakableRuleSet are collection of rules that can be modified or restricted from modification in any test cases, wherein the matrix [0, u], the u is a variable with a given value for an input pf test case, wherein the j-level title is a categorizing the certificates under a test for validation.

3. The RFC-directed differential testing method of the certificate validation in SSL/TLS implementations of claim 1 further comprises:

(1) classifying the updated rules into 3 categories including producer rules, consumer rules, and shared rules; wherein, a producer rule set producerRuleSet, a consumer rule set consumerRuleSet, and a shared rule set sharedRuleSet are set as null sets, respectively; for each rule r in an updated rule set updatedRuleSet of RFC 5280 and any pattern m in a pattern set of the producer rules, if r matches with m, then r is added to producerRuleSet; for any pattern m' in a pattern set of consumer rules, if r matches with m', then r is added to consumerRuleSet; the shared rule set is an intersection set of the producer rule set and the consumer rule sharedRuleSet=producerRuleSet∩consumerRuleSet; the shared rule set is removed from the producer rule set and the consumer rule set producerRuleSet-=sharedRuleSet and consumerRuleSet-=sharedRuleSet; the rules excluding the producer rules and consumer rules updatedRuleSet-producerRuleSet-consumerRuleSet are finally collected as the shared rules;

(2) further classifying the consumer rules and shared rules into breakable rules and unbreakable rules; wherein a breakable rule set breakableRuleSet, an unbreakable rule set unbreakableRuleSet, and a pattern set of the unbreakable rules patternSet are set as null sets, respectively; for any keyword m in the keyword set specified in RFC 2119 and any unbreakable rule pattern u, m+"z,41 "+u is added to patternSet; for any rule r in a consumer rule and shared rule set csrSet and any pattern p in patternSet if r matches with p, then r is added to unbreakableRuleSet; and the unbreakable rule set is calculated according to breakableRuleSet= csrSet-unbreakableRuleSet;

(3) expressing the breakable rules and unbreakable as variables; wherein a response set responseSet, and other reserved word set otherSet and a rule variable set varSet are set as null sets; keywords specified in RFC 2119 are added to a keyword set modalKeywordSet, words representing a sentence structure are added to a sentence structure set sentencePatterns, words representing logic relationships are added to a logic pattern set logicPatterns, words representing responses are added to a response pattern set respousePatterns, digital patterns are added to an another reserved word pattern set otherPatterns, names and variations of digital certificate components are added to a component name set componentSet; for any keywordrmin modalKeywordSetand any response pattern rp in responsePatterns, words after m+"-"+rp in each unbreakable rule and breakable rule r are added to responseSet; the words in r that matches with any pattern p in otherPatterns are added to otherSet; a reserved word set reservedSet is a union set of modalKeywordSet, sentencePatterns, logicPatterns, componentSet, responseSet, and otherSet; for each unbreakable rule and breakable rule r, words in r that do not belong to reservedSet are deleted to obtain r'; for any r', if r' is expressed by a natural language, then all conditions expressed by the rule are obtained according to a syntax structure; for each condition, first condition="$c_1$, $v_1$, . . . $c_i$, $v_i$" is obtained, wherein $c_1$, . . . , $c_i$ are names of components involved in this condition, $v_1$, . . . $v_i$ are values of corresponding components, i∈ℕ; if r' is an unbreakable rule, and if there is a response part, then the response response="consumer,actions" is obtained; condition [+":"+response] is added to varSet, wherein square brackets represent that when there is a response, it is indicated by condition+":"+response, otherwise it is indicated by condition; if r' is the breakable rule, and if there is a result part, then the result result="$c_1v_1$, . . . $c_j$, $v_j$" is obtained; condition[+":"+result] is added to varSet, wherein the square brackets represent that when there is a result, it is indicated by condition+":"+result, otherwise it is indicated by condition; for any r', if r'is expressed by ASN.1, and if there is an embedded constraint t for each optional component c, then a constraint of c is constraint$_c$={"c,absent",t}, if there is no embedded constraint, then constraint$_c$={"c,absent", "c, present"}; for each non-optional component c', the constraint is constraint$_c$={"c,validValue"}; and constraints of r' are combined and added to varSet; for each constraint in varSet, commas and colons ( ","and ":") are replaced by single underscore and double underscores ("_" and "__") respectively;

(4) forming the symbolic program according to a DSE technology by using rule variables; wherein "#include <stdio.h>", "#include <klee/klee.h>" and "int main ( ){" are produced; variable declarations are produced for the rule variables; the rule variables corresponding to the unbreakable rules and the breakable rules are symbolized, respectively; "if (v>0) printf("v>0") else" is produced for a rule variable v corresponding to the unbreakable rule; "if (v'<0) printf ("v'<0") else" is produced for a rule variable v' corresponding to the breakable rule; the redundant "else" is deleted and "}" is added; and a file C is saved.

4. The RFC-directed differential testing method of the certificate validation in SSL/TLS implementations of claim 1 further comprises:

employing the assembled digital certificates in the differential testing of certificate validation in SSL/TLS implementations;

calculating the discrepancy number, the distinct discrepancy number, the bug number, and the RFC conformance ratio in the test result by using the information formed during an assembly of the digital certificate;

wherein, specific RFC rules that are obeyed or violated by the digital certificate are determined during an assembly of the digital certificate, so an (m+3)-dimension vector $\overrightarrow{RFCcert} = \langle SN, RFCreason, RFCresult, ResultI_1, \ldots, ResultI_m \rangle$ is formed;

wherein, SN is a serial number of the digital certificate; RFCreason records RFC rules that are obeyed or violated by the digital certificate; RFCresult represents whether the digital certificate should be accepted or rejected according to the RFC rules; $ResultI_i$ ($1 \leq i \leq m$) represents whether the digital certificate should be accepted or rejected by the $i^{th}$ SSL/TLS implementation being tested; the discrepancy number, the distinct discrepancy number, and the bug number in the test result are calculated based on information below:

for any digital certificate, if there are tested SSL/TLS implementations $I_i$ and $I_j$ which make $ResultI_i \neq ResultI_j$, then a discrepancy is found in the test result;

for all the digital certificates that generate discrepancies, if a vector $\langle ResultI_1, \ldots, ResultI_m \rangle_x$ of a digital certificate x is different from a vector $\langle ResultI_1, \ldots, ResultI_m \rangle_y$ of any other digital certificate y, then a distinct discrepancy is found in the test result.

5. A computer software analysis system comprising a hardware server and applying an Request For Comments (RFC)-directed differential testing method of a certificate validation in Secure Sockets Layer/Transport Layer Security (SSL/TLS) implementations, the method comprises the steps of:

classifying rules;

expressing the rules as variables;

generating a first Certificate Authority certificate first-level test cases;

generating a symbolic program, wherein generating the first Certificate Authority certificate first-level test cases by applying a dynamic symbolic execution technique to the symbolic program and assembling a second Certificate Authority certificate second-level test cases according to the first Certificate Authority certificate first-level test cases to obtain an assembled digital certificates, wherein the second Certificate Authority certificate second-level test cases are digital certificates; processing the symbolic program by using a DSE technology; saving the first Certificate Authority certificate first-level test cases produced by the Dynamic Symbolic Execution (DSE) as a text file by a redirection technology; reserving rule variables with non-zero values, replacing 2147483647 and −2147483648 with 1 and −1, respectively, for each text file, and deleting empty text files; setting a valid value for a basic component of the digital certificates; setting valid values for the components of basicConstraints and keyUsage if a certificate of a certification authority is being assembled; setting a value of a component in a condition part of the first Certificate Authority certificate first-level test cases according to a corresponding value requirement of the condition part; leaving a response part of the first Certificate Authority certificate first-level test cases for observation without any processing and setting a value required in violating a result part for a component in the result part of the first Certificate Authority certificate first-level test cases; signing tbsCertificate a signature by using a signature algorithm of signature in tbsCertificate if signatureAlgorithm has not been set yet; and encoding the certificate and saving it as a digital certificate file;

assembling the second Certificate Authority certificate second-level cases according to the first Certificate Authority certificate first-level test cases to obtain the assembled digital certificates; and employing the assembled digital certificates to a differential testing of the certificate validation in SSL/TLS implementations;

extracting the rules of a digital certificate from RFCs 5280 and 6818 according to a keyword set specified in RFC 2119 and updating rules of RFC 5280 according to RFC 6818 to obtain updated rules;

classifying the updated rules into three categories: producer rules, consumer rules, and shared rules, further classifying the consumer rules and the shared rules into breakable rules and unbreakable rules, expressing the updated rules as variables, and generating the symbolic program;

employing the assembled digital certificates to the differential testing of the certificate validation in SSL/TLS implementations and calculating a discrepancy number, a distinct discrepancy number, a bug number, and an RFC conformance ratio in test results based on information of the digital certificate;

if RFCresult shows that an acceptance or rejection of the digital certificate are all in accordance with the RFC rules, then the discrepancy is invalid;

if $ResultI_i$ ($1 \leq i \leq m$) does not match with RFCresult, then a bug in SSL/TLS implementations is found, and RFCreason provides a reason for an occurrence of the bug;

an RFC conformance ratio of the $i^{th}$ SSL/TLS implementation is calculated by the following formula:

$$CR(i) = \frac{|RFCresult \text{ matches } ResultI_i|}{|certs|} \times 100\%,$$

wherein |RFCresult matches $ResultI_i$| is a number of results complying with the RFC in the test results, |certs| is a number of a vector $\overrightarrow{RFCcert}$ in the testing, RFCcert is a number of vector in the testing for validation with an assigned value by the Certificate Authority.

6. The computer software analysis system applying the RFC-directed differential testing method of the certificate validation in SSL/TLS implementations of claim 5 further comprises:

(1) extracting the rules of the digital certificate from RFCs 5280 and 6818 according to a keyword set required to be obeyed in writing RFCs specified in RFC 2119; wherein page breaks, headers, footers, and redundant blank lines in a text of RCF 5280 or RFC 6818 are deleted and a text after deletion is recorded as R; R is split into a plurality of sections according to Level 1 titles; for each of the plurality of sections from Section 4 to 8 in RFC 5280 and Section 2 to 8 in RFC 6818, a rule set variable ruleSet is set as a null set and a rule number ruleNum is set as 0; then an English sentence in a content between arbitrary j-level title ($1 \leq j \leq 5$) of RFC 5280, arbitrary j-level title ($1 \leq j \leq 2$) of RFC 6818 and the next title thereof are extracted according to ".\n" and ".", a structure represented by Abstract Syntax Notation One (ASN.1) is extracted according to "::=", "::={ln . . . }ln" and "::={ln . . . }ln'", wherein "::=", "::={ln . . . }ln" and "::={ln . . . }ln'" respectively represent no left and right braces, having left and right braces which are in the same row, and having left and right brace which are not in the same row in an ASN.1 structure definition; whether keywords specified in RFC 2119 are contained is determined for each English sentence and each ASN.1 structure, if keywords are contained, then the sentence or structure is a rule which is recorded as s, meanwhile, ruleNum is added by 1, ruleNum, the j-level title, and the rule s constitute a triple s'=(ruleNum,Titlej,s); the s' is added in ruleSet; and ruleSet is saved as a text file;

(2) updating the rules of RFC 5280 according to RFC 6818; wherein the rules in a respective section are respectively added to an obsolete rule set obRuleSet and an updated rule set upRuleSet according to a characteristic of RFC 6818 in which marks ". . . says:", ". . . replaced with: " and "add(ed). . . " indicate obsolete, updated, and additional paragraphs, respectively; then, a word set wordSet$_r$ that constitute each rule r is calculated, and a word set difference of any two rules $r_1$ and $r_2$ is calculated i.e. Matrix$[r_1,r_2]$=|wordSet$_{r1}$−wordSet$_{r2}$|; finally, each rule o in obRuleSet is calculated as follows: finding out the u that makes Matrix[o,u] have the smallest value by calculation from all of the u in upRuleSet, and the u obtained is assigned to the updated rule recorded asUpdate$_o$of rule o, Update$_o$=arg min$_u$(Matrix[o,u]), if such Matrix [o,u] does not exist, the rule o is discarded so Update$_o$=discarded, if Matrix[o,u]=Matrix [u,o]=0, the rule o is not changed, so Update$_o$=unchanged, otherwise, the rule u is used to update the rule o so Update$_o$=u, and the rule o of RFC 5280 is updated by Update$_o$;

wherein the upRuleSet and the updated RuleSet are sets of rules that modifiable with regards to a certificate validation test case, wherein the breakableRuleSet and unbreakableRuleSet are collection of rules that can be modified or restricted from modification in any test cases, wherein the matrix [0, u], the u is a veriable with a given value for an input pf test case, wherein the j-level title is a categorizing the certificates under a test for validation.

7. The computer software analysis system applying the RFC-directed differential testing method of the certificate validation in SSL/TLS implementations of claim 5 further comprises:

(1) classifying the updated rules into 3 categories including producer rules, consumer rules, and shared rules; wherein, a producer rule set producerRuleSet, a consumer rule set consumerRuleSet, and a shared rule set sharedRuleSet are set as null sets, respectively; for each rule r in an updated rule set updatedRuleSet of RFC 5280 and any pattern m in a pattern set of the producer rules, if r matches with m, then r is added to producerRuleSet; for any pattern m' in a pattern set of consumer rules, if r matches with m', then r is added to consumerRuleSet; the shared rule set is an intersection set of the producer rule set and the consumer rule sharedRuleSet=producerRuleSet∩consumerRuleSet; the shared rule set is removed from the producer rule set and the consumer rule set producerRuleSet−=sharedRuleSet and consumerRuleSet−=sharedRuleSet; the rules excluding the producer rules and consumer rules updatedRuleSet−producerRuleSet−consumerRuleSet are finally collected as the shared rules;

(2) further classifying the consumer rules and shared rules into breakable rules and unbreakable rules; wherein a breakable rule set breakableRuleSet, an unbreakable rule set unbreakableRuleSet, and a pattern set of the unbreakable rules patternSet are set as null sets, respectively; for any keyword m in the keyword set specified in RFC 2119 and any unbreakable rule pattern u, m+"⇌"+u is added to patternSet; for any rule r in a consumer rule and shared rule set patternSet and any pattern p in patternSet, if r matches with p, then r is added to unbreakableRuleSet; and the unbreakable rule set is calculated according to breakableRuleSet= csrSet−unbreakableRuleSet;

(3) expressing the breakable rules and unbreakable as variables; wherein a response set responseSet, and other reserved word set otherSet and a rule variable set varSet are set as null sets; keywords specified in RFC 2119 are added to a keyword set modalKeywordSet, words representing a sentence structure are added to a sentence structure set sentencePatterns, words representing logic relationships are added to a logic pattern set logicPatterns, words representing responses are added to a response pattern set responsePatterns, digital patterns are added to an another reserved word pattern set otherPatterns, names and variations of digital certificate components are added to a component name set componentSet; for any keyword m in modalKeywordSet and any response pattern rp in responsePatterns, words after m+"⇌"+rp in each unbreakable rule and breakable rule r are added to responseSet; the words in r that matches with any pattern p in otherPatterns are added to otherSet; a reserved word set reservedSet is a union set of modalKeywordSet, sentencePatterns, logicPatterns, componentSet, responseSet, and otherSet; for each unbreakable rule and breakable rule r, words in r that do not belong to reservedSet are deleted to obtain r'; for any r', if r' is expressed by a natural language, then all conditions expressed by the rule are obtained according to a syntax structure; for each condition, first condition="$c_1$, $v_1$ . . . $c_i$, $v_i$" is obtained, wherein $c_1$, . . . $c_i$ are names of components involved in this condition, $v_1$, . . . $v_i$ are values of corresponding components, $i \in \mathbb{N}$; if r' is an unbreakable rule, and if there is a response part, then the response response="consumer,actions" is obtained; condition[+":"+response] is added to varSet, wherein square brackets represent that when there is a response, it is indicated by condition+":"+response, otherwise it is indicated by condition; if r' is the breakable rule, and if there is a result part, then the result result="$c_1$, $v_1$, . . . $c_j$, $v_j$" is obtained; condition[+":"+result] is added to varSet, wherein the square brackets represent that when there is a result, it is indicated by condition+":"+result, otherwise it is indicated by condition; for any r', if r'is expressed by ASN.1, and if there is an embedded constraint t for each optional component c, then a constraint of c is constraint$_c$={"c,absent",t}, if there is no embedded constraint, then constraint$_c$= {"c,absent", "c,present"}; for each non-optional component c', the constraint is $constraint_{c'}$={"c,validValue"}; and constraints of r' are combined and added to varSet; for each constraint in varSet, commas and colons (","and ":") are replaced by single underscore and double underscores ("_" and "__") respectively;

(4) forming the symbolic program according to a DSE technology by using rule variables; wherein "#include <stdio.h>", "#include <klee/klee.h>" and "int main( ){" are produced; variable declarations are produced for the rule variables; the rule variables corresponding to the unbreakable rules and the breakable rules are symbolized, respectively; "if (v>0) printf("v>0") else" is produced for a rule variable v corresponding to the unbreakable rule; "if (v'<0) printf ("v'<0") else" is produced for a rule variable v' corresponding to the breakable rule; the redundant "else" is deleted and "}" is added; and a file C is saved.

8. The computer software analysis system applying the RFC-directed differential testing method of the certificate validation in SSL/TLS implementations of claim 5 further comprises:

employing the assembled digital certificate in the differential testing of certificate validation in SSL/TLS implementations;

calculating the discrepancy number, the distinct discrepancy number, the bug number, and the RFC conformance ratio in the test result by using the information formed during an assembly of the digital certificate;

wherein, specific RFC rules that are obeyed or violated by the digital certificate are determined during an assembly of the digital certificate, so an (m+3)-dimension vector $\overrightarrow{RFCcert}$=⟨SN, RFCreason, RFCresult, Result-$I_1$, ..., Result$I_m$⟩ is formed;

wherein, SN is a serial number of the digital certificate; RFCreason records RFC rules that are obeyed or violated by the digital certificate; RFCresult represents whether the digital certificate should be accepted or rejected according to the RFC rules;

Result$I_i$(1≤i≤m) represents whether the digital certificate should be accepted or rejected by the $i^{th}$SSL/TLS implementation being tested; the discrepancy number, the distinct discrepancy number, and the bug number in the test result are calculated based on information below:

for any digital certificate, if there are tested SSL/TLS implementations $I_i$ and $I_j$ which make Result$I_i$≠Result$I_j$, then a discrepancy is found in the test result;

for all the digital certificates that generate discrepancies, if a vector ⟨Result$I_1$, ..., Result$I_m$⟩$_x$ of a digital certificate x is different from a vector ⟨Result$I_1$, ..., Result$I_m$⟩$_y$ of any other digital certificate y, then a distinct discrepancy is found in the test result.

* * * * *